(12) United States Patent
Tsunekawa

(10) Patent No.: US 7,316,631 B2
(45) Date of Patent: Jan. 8, 2008

(54) AUTOMATIC TRANSMISSION APPARATUS

(75) Inventor: Kazutoshi Tsunekawa, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 267 days.

(21) Appl. No.: 11/235,085

(22) Filed: Sep. 27, 2005

(65) Prior Publication Data

US 2006/0068976 A1   Mar. 30, 2006

(30) Foreign Application Priority Data

Sep. 28, 2004   (JP) ............................. 2004-280858

(51) Int. Cl.
*F16H 61/58* (2006.01)
*B60W 10/02* (2006.01)
(52) U.S. Cl. ........................................ 477/62; 477/181
(58) Field of Classification Search .................. 477/53, 477/62, 64, 168, 169, 180, 181, 107; 475/35, 475/36, 59, 60, 61
See application file for complete search history.

(56) References Cited

U.S. PATENT DOCUMENTS

| | | | | | |
|---|---|---|---|---|---|
| 2,882,750 | A | * | 4/1959 | Duffield ........................ 477/64 |
| 4,016,778 | A | * | 4/1977 | VON Greyerz ............... 475/32 |
| 4,905,529 | A | * | 3/1990 | Nakano ........................ 476/10 |
| 5,213,186 | A | * | 5/1993 | Murata ........................ 477/169 |
| 6,139,466 | A | * | 10/2000 | Nishino ........................ 477/65 |
| 6,942,598 | B2 | * | 9/2005 | Kondo et al. ................ 477/169 |
| 7,247,123 | B2 | * | 7/2007 | Ohtake et al. ................. 477/98 |
| 2003/0196503 | A1 | * | 10/2003 | Kobayashi .................... 74/333 |

FOREIGN PATENT DOCUMENTS

JP            61-23485        2/1986

* cited by examiner

*Primary Examiner*—Roger Pang
(74) *Attorney, Agent, or Firm*—Buchanan Ingersoll & Rooney PC

(57) ABSTRACT

An automatic transmission apparatus includes: a torque converter including a pump impeller connected to an engine and a turbine connected to an input shaft of an automatic transmission; an oil pump connected to the pump impeller and to the turbine; and a controlling means for selecting one of the engine and the turbine as a driving power source of the oil pump. The oil pump generates an oil pressure by rotation of the selected one of the engine and the turbine.

15 Claims, 2 Drawing Sheets

AUTOMATIC TRANSMISSION APPARATUS

CROSS REFERENCE TO RELATED APPLICATIONS

This application is based on and claims priority under 35 U.S.C. §119 with respect to Japanese Patent Application 2004-280858, filed on Sep. 28, 2005, the entire content of which is incorporated herein by reference.

FIELD OF THE INVENTION

This invention generally relates to an automatic transmission apparatus. More specifically, this invention pertains to an automatic transmission apparatus having an oil pump by which an operating fluid is supplied to a plurality of clutches in an automatic transmission.

BACKGROUND

An oil pump, in other words a hydraulic pump, which supplies an operating fluid to an automatic transmission, is driven by an engine. Therefore, while a lock-up clutch is being disengaged, or during a coast down state, an engine rotational speed (i.e., a rotational speed of a crankshaft) falls down about to a level of an idling rotational speed, by which the oil pump is disable to discharge an operating fluid at an adequate amount, and further it may become difficult to assure an enough level of an operating fluid pressure. JP1986(61)-23485U discloses an oil pump apparatus provided with two integral gear pumps. This oil pump apparatus assures an amount of discharged oil at an engine low rotational speed range, and generates a desired level of operating fluid pressure. According to this oil pump apparatus, at an engine high rotational speed range, only one of the two gear pumps are driven so that it is possible to avoid an occurrence of an excessive oil pressure. Therefore, superior work efficiency can be expected.

As described above, an amount of discharged oil depends on an engine rotational speed. When an activation of an engine is discontinued, even by the oil pump apparatus disclosed above, it may be difficult to assure an oil pressure at a level which is required to control a shift operation or a lock-up clutch. As is obvious from that, an oil pressure level varies depending on whether any operations, by which an engine rotational speed drops suddenly, are implemented in response to a shift operation, or otherwise, an engine rotational speed-dependency of an amount of discharged oil contributes to complicating a correction of control parameters which are referred to at a shift operation control or a lock-up clutch control.

In the light of the foregoing, another type of oil pump apparatus has been known, in which electrically driven oil pumps, which are arranged in parallel, are capable of being operated as an auxiliary oil pump, for the purpose of compensating for an amount of discharged oil at a time that an engine rotational speed drops, or an engine is stopped. According to this oil pump apparatus, an entire structure may become complicated, and additional equipments, such as a motor pump, may be required, which may not be able to solve the above matters. Moreover, if a vehicle is being driven, it is more economical to consume a vehicle driving energy, in terms of generating an oil pressure. Still moreover, a positive vehicle driving method may be proposed, a method by which a vehicle inertia driving is performed more frequently for the purpose of restraining a fuel consumption rate.

The present invention has been made in view of the above circumstances, and provides an automatic transmission apparatus by which an oil pump is capable of being operated by a driving power source that is different from an engine being rotated.

SUMMARY OF THE INVENTION

According to an aspect of the present invention, an automatic transmission apparatus for a vehicle includes: a torque converter including a pump impeller connected to an engine and a turbine connected to an input shaft of an automatic transmission; an oil pump connected to the pump impeller and to the turbine; and a controlling means for selecting one of the engine and the turbine as a driving power source of the oil pump. The oil pump generates an oil pressure by rotation of the selected one of the engine and the turbine.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figure 1:
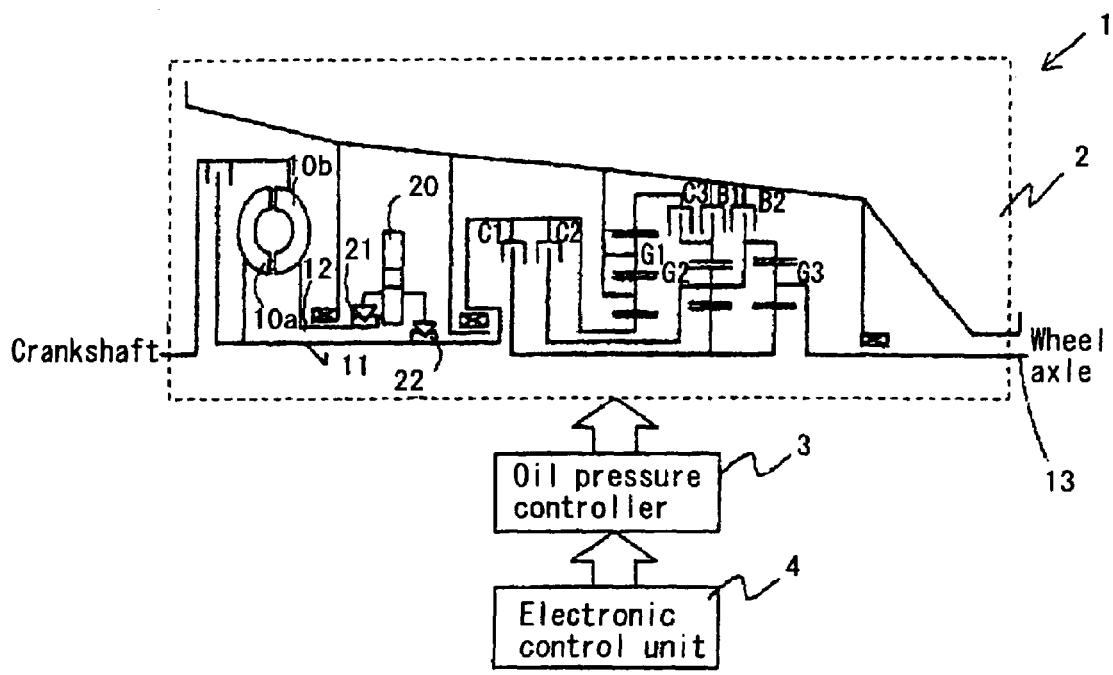
FIG. 1 is a block view schematically illustrating an entire structure of an automatic transmission apparatus according to an embodiment of the present invention.

As is illustrated in FIG. 1, an automatic transmission apparatus 1 is provided with an automatic transmission 2, an oil pressure controller 3, and an electronic control unit 4 (i.e., a controlling means). The automatic transmission 2 incorporates, therein, an input shaft 11 connected to a turbine runner 10a (turbine) of a torque converter, an extension sleeve 12 connected to connected to a pump impeller 10b, an output shaft 13 connected to a wheel axle, and an A/T oil pump 20 connected to the input shaft 11 via a one-way clutch 22 (a second one-way clutch), and connected to the extension sleeve 12 via a one-way clutch 21 (a first one-way clutch). The automatic transmission 2 further incorporates, therein, a double-pinion planetary gear G1 connected to the input shaft 11, a second single-pinion planetary gear G2 and a third shingle-pinion planetary gear G3. The automatic transmission 2 still further incorporates, therein, five frictional engagement elements: a first frictional clutch C1; a second frictional clutch C2; a third frictional clutch C3; a first frictional brake B1; and a second frictional brake B2. These frictional engagement elements are engaged and disengaged by the oil pressure controller 3 and the electronic control unit 4, by which a shift stage can be established in the automatic transmission 2.

The electronic control unit 4 is a microcomputer which is capable of controlling, on the basis of an input value from various sensors (not illustrated), a driving of the oil pressure controller 3. On the basis of commands from the electronic control unit 4, the oil pressure controller 3 controls a shift operation in the automatic transmission 2 and a lock-up clutch operation for engaging and disengaging a lock-up clutch. In order to control a shift operation in the automatic transmission 2, the oil pressure controller 3 controls a switching operation of an oil pressure circuit inside thereof, so as to select frictional engagement elements from among the five frictional engagement elements C1, C2, C3, B1 and B2, and so as to control levels of oil pressure to be supplied to the selected frictional engagement elements. As described above, a shift stage can be established in the automatic transmission 2.

Figure 2:
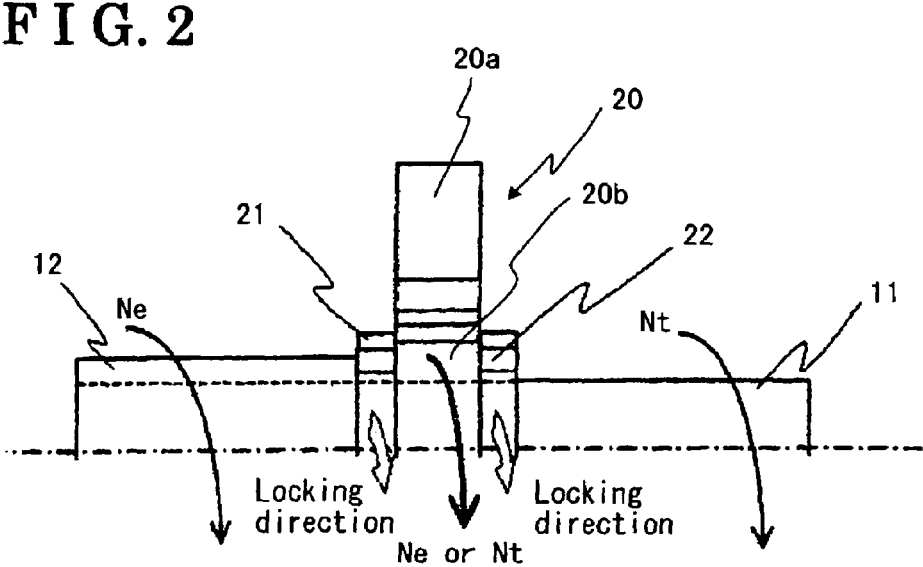
FIG. 2 is a view illustrating a structure for driving an oil pump for the automatic transmission apparatus.

As is illustrated in FIG. 2, the one-way clutch 21 connects the drive gear 20*b* (drive shaft) of the A/T oil pump 20 and the pump impeller 10*b*. For example, the one-way clutch 21 is employed to transmit, via the extension sleeve 12, a rotational driving force of the engine to the drive gear 20*b* (drive shaft) and driven gear 20*a* of the A/T oil pump 20, so that a drive gear 20*b* inside the A/T oil pump 20 can be driven. The one-way clutch 21 is further employed not to transmit a rotational driving force of the drive gear 20*b* inside the A/T oil pump 20 to the engine. The one-way clutch 22 connects the drive gear 20*b* (drive shaft) of the A/T oil pump 20 and the turbine runner 10*a*. For example, the one-way clutch 22 is employed to transmit, via the input shaft 11, a rotational driving force of the turbine runner 10*a* to the drive gear 20*b* (drive shaft) and the driven gear 20*a* of the A/T oil pump 20, so that the drive gear inside the A/T oil pump 20 can be driven. The one-way clutch 22 is further employed not to transmit the rotational driving force of the drive gear 20*b* inside the A/T oil pump 20 to the turbine runner 10*b*, i.e., to the input shaft 11.

As described above, according to the embodiment of the present invention, at least one of the engine and the turbine runner 10*a* can be employed, via at least one of the one-way clutches 21 and 22, as a driving power source for driving the A/T oil pump 20. For example, the A/T oil pump 20 can be driven by one of the engine and the turbine runner 10*a*, a rotational speed of one of which is greater than a rotational speed of the other.

Figure 3:
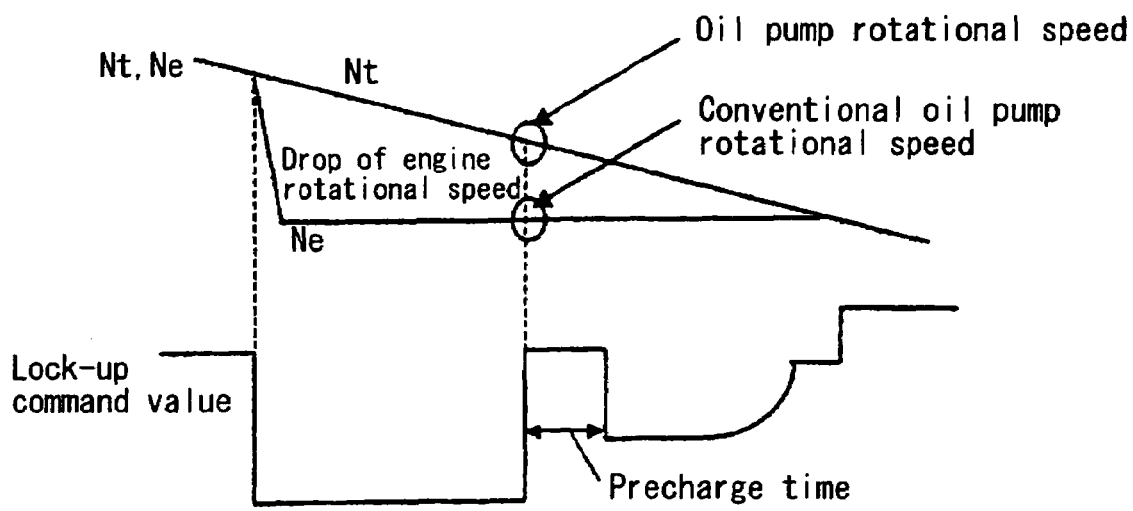
FIG. 3 is a diagram for explaining transitions in an input rotational speed of the oil pump at a time that a shift operation is implemented in a case where a throttle valve is being fully closed.

Next, described below is an operation implemented by the automatic transmission apparatus according to the embodiment of the present invention, with reference to FIG. 3. FIG. 3 is a diagram for explaining transitions in an input rotational speed of an oil pump for an automatic transmission at a time that a shift operation is implemented in a case where a throttle valve is being fully closed. In FIG. 3 "Nt" represents a rotational speed of the turbine runner 10*a* connected to the drive gear 20*b* (drive shaft) of the oil pump 20, and "Ne" represents a rotational speed of the engine, i.e., a rotational speed of the pump impeller 10*b* connected to the drive gear 20*b* (drive shaft) of the oil pump 20. That is, an input rotational speed of the A/T oil pump 20 according to the embodiment of the present invention can be expressed with "Nt or Ne", while an input rotational speed of an oil pump for a conventional automatic transmission can be expressed with only "Ne". As is denoted with "Ne" in FIG. 3, once the lock-up clutch is disengaged during a shift operation in a case where the throttle valve is being fully closed, the engine rotational speed drops down about to a level of an idling rotational speed.

FIG. 3 explains a difference between a rotational speed of an A/T oil pump of a conventional automatic transmission and a rotational speed of the A/T oil pump 20 according to the embodiment of the present invention, at a time of initiating a precharge-control for engaging the lock-up clutch. The A/T oil pump of a conventional automatic transmission is driven only by use of rotation of an engine as a driving power source. Therefore, as is illustrated in FIG. 3, a rotational speed "Ne" of the A/T oil pump is inferior to a rotational speed "Nt" of the A/T oil pump 20, in other words, there is on occasions a danger of a shortage of oil discharged from the oil pump for the conventional automatic transmission. Meanwhile, the A/T oil pump 20 according to the embodiment of the present invention can be selectively driven by use of rotation of an engine or by use of rotation of the turbine runner 10*a*. Although a rotational speed of the turbine runner 10*a* is on a downward trend, it is not as low as a rotational speed of the engine, as is illustrated in FIG. 3. Therefore, according to the embodiment of the present invention, it is possible to remarkably increase an amount of oil discharged by the A/T oil pump 20, compared with an oil pump of a conventional automatic transmission.

Therefore, as described above, even if an engine rotational speed drops down about to an idling rotational speed due to a coast down control, it is possible for the A/T oil pump 20 to discharge an efficient amount of oil for supplying an adequate level of oil pressure, which is capable of facilitating a precharge-control when the lock-up clutch is engaged again. Further, it is possible to enhance a precision for implementing a precharge-control, thereby enabling to abbreviate a time lag before an engine brake is effected, i.e., before a reengagement operation of the lock-up clutch.

Figure 4:
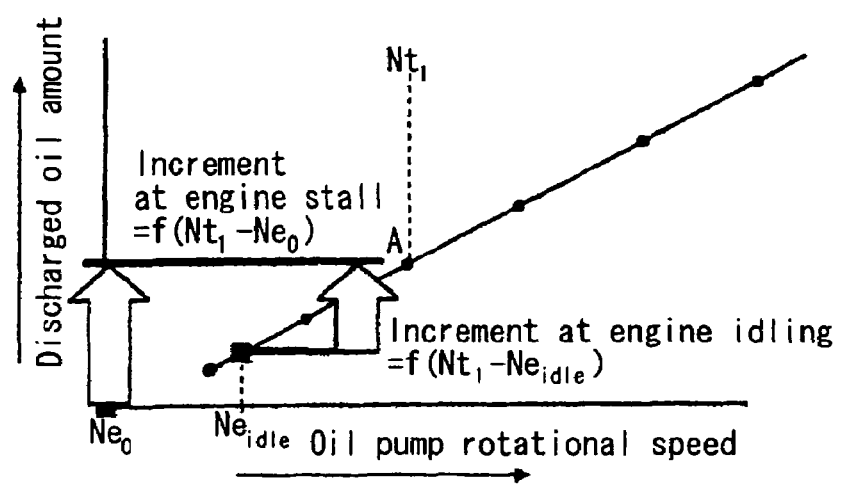
FIG. 4 is a diagram for explaining a relationship between the input rotational speed of the oil pump and the discharged oil amount.

FIG. 4 is a diagram for explaining a relationship between an input rotational speed of an oil pump for an automatic transmission and an amount of oil discharged by the oil pump. When an input rotational speed of the oil pump is substantially equal to an engine idling rotational speed $Ne_{idle}$, an amount of oil discharged by the oil pump is expressed with "$f(Ne_{idle})$". On the other hand, when an input rotational speed of the oil pump is substantially equal to a turbine runner rotational speed $Nt_1$ (denoted with "A" in FIG. 4), an amount of oil discharged by the oil pump is expressed with "$f(Nt_1)$".

For example, when an engine rotational speed drops down about to an engine idling rotational speed while a vehicle is being driven, according to a conventional structure of an automatic transmission apparatus, an amount of oil discharged by an oil pump falls down to "$f(Ne_{idle})$", while, according to the embodiment of the present invention, an amount of oil discharged by the A/T oil pump 20 can be obtained at "$f(Nt_1)$" at a time that a rotational speed of the turbine runner 10*a* is $Nt_1$. Therefore, as is illustrated in FIG. 4, an increment of the discharged oil corresponds to "$f(Nt_1 - Ne_{idle})$". Likewise, for example, when an engine activation is stopped while a vehicle is being driven, according to a conventional structure of an automatic transmission apparatus, an amount of oil discharged by an A/T oil pump falls down to "$f(Ne_0)$", while, according to the embodiment of the present invention, an amount of oil discharged by the A/T oil pump 20 can be obtained at "$f(Nt_1)$" at a time that a rotational speed of the turbine runner 10*a* is Nt1. Therefore, as is illustrated in FIG. 4, an increment of the discharged oil corresponds to "$f(Nt_1 - Ne_0)$".

As described above, according to the embodiment of the present invention, because the A/T oil pump 20 can be driven by rotation of the turbine runner 10*a*, it is possible to implement a shift operation control or a lock-up clutch operation control even when an engine rotational speed is decreased, or an engine activation is stopped during a vehicle driving. Because a shift operation or a lock-up clutch operation can be always controlled, it is possible to add the following functions to the automatic transmission apparatus according to the embodiment of the present invention. For example, when a shift-down operation is implemented while an engine rotational speed is low, it is possible to effect an engine brake. Moreover, it is possible to activate an engine again by rotating a crankshaft from a side of a wheel axle, without employing a starter motor. Therefore, it is possible for the automatic transmission apparatus according to the embodiment of the present invention to establish a vehicle special driving mode which is preferable for a high-fuel efficiency, such as an engine start by pushing a vehicle of which a battery runs out, an engine start from a vehicle inertia driving condition, in which an engine activation is discontinued, and so on.

Further, according to the embodiment of the present invention, it is possible to compulsorily rotate an engine by engaging the lock-up clutch in response to rotation of the turbine runner 10a. Therefore, an additional failsafe mechanism can be provided without ignition an engine fuel, an additional fail safe mechanism according to which a power steering mechanism, a foot brake assist mechanism, an exhaust retarder can be utilized by use of an engine as a driving power source.

As described above, according to the embodiment of the present invention, compared with a conventional automatic transmission apparatus by which an amount of discharged oil depends on only an engine rotational speed, it is possible to assure an sufficient level of oil pressure and to control a shift operation and a lock-up clutch. Further, even if an engine activation is discontinued, as far as a vehicle is being driven, it is possible to transmit a rotational driving force of a drive wheel to an engine side. Therefore, it is possible to effect an engine brake, to restart an engine, to restart an engine by pushing a vehicle, to utilize a power steering mechanism and various brake assisting mechanisms, and so on.

The present invention is not limited to the above-described embodiment, and can be applied to any types of A/T oil pump.

The principles, the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An automatic transmission apparatus for a vehicle comprising:
   a torque converter including a pump impeller connected to an engine and a turbine connected to an input shaft of an automatic transmission;
   an oil pump connected to the pump impeller and to the turbine; and
   a controlling means for selecting one of the engine and the turbine as a driving power source of the oil pump,
   wherein the oil pump generates an oil pressure by rotation of the selected one of the engine and the turbine.

2. An automatic transmission apparatus for a vehicle according to claim 1, wherein:
   a controlling means for selecting one of the engine and the turbine as a driving power source of the oil pump is a first one-way clutch connecting a drive shaft of the oil pump and the pump impeller, and a second one-way clutch connecting the drive shaft of the oil pump and the turbine.

3. An automatic transmission apparatus for a vehicle according to claim 1, further comprising:
   a lock-up clutch capable of connecting the pump impeller and the turbine runner,
   wherein, the controller disengages the lock-up clutch and establishes a vehicle inertia driving condition in which an engine activation is discontinued, and
   wherein, in response to a predetermined operation during the vehicle inertial driving condition, the controller establishes a predetermined shift stage in the automatic transmission and engages the lock-up clutch in such a manner that a rotational driving force of a wheel axle side is transmitted to the engine.

4. An automatic transmission apparatus for a vehicle according to claim 2, further comprising:
   a lock-up clutch capable of connecting the pump impeller and the turbine,
   wherein, the controller disengages the lock-up clutch and establishes a vehicle inertia driving condition in which an engine activation is discontinued, and
   wherein, in response to a predetermined operation during the vehicle inertial driving condition, the controller establishes a predetermined shift stage in the automatic transmission and engages the lock-up clutch in such a manner that a rotational driving force of a wheel axle side is transmitted to the engine.

5. An automatic transmission apparatus for a vehicle according to claim 1, further comprising:
   a lock-up clutch capable of connecting the pump impeller and the turbine,
   wherein the controller disengages the lock-up clutch and establishes a vehicle inertia driving condition in which an engine activation is discontinued, and
   wherein, in response to an engine restarting operation during the vehicle inertia driving condition, the controller controls an engine ignition without using a starter motor, and the controller establishes a predetermined shift stage in the automatic transmission and engages the lock-up clutch in such a manner that a rotational driving force of a wheel axle side is transmitted to the engine.

6. An automatic transmission apparatus for a vehicle according to claim 2, further comprising:
   a lock-up clutch capable of connecting the pump impeller and the turbine,
   wherein the controller disengages the lock-up clutch and establishes a vehicle inertia driving condition in which an engine activation is discontinued, and
   wherein, in response to an engine restarting operation during the vehicle inertia driving condition, the controller controls an engine ignition without using a starter motor, and the controller establishes a predetermined shift stage in the automatic transmission and engages the lock-up clutch in such a manner that a rotational driving force of a wheel axle side is transmitted to the engine.

7. An automatic transmission apparatus for a vehicle according to claim 2, wherein the drive shaft of the oil pump, which is connected to the pump impeller via the first one-way clutch, is a drive gear of the oil pump, and the input shaft of the automatic transmission penetrates an inside of the drive gear.

8. An automatic transmission apparatus for a vehicle according to claim 1, further comprising:

the automatic transmission incorporating, therein, at least one planetary gear and at least one frictional engagement element, wherein the controller controls engagement, and disengagement, of the at least one frictional engagement element by the oil pressure generated by the oil pump.

9. An automatic transmission apparatus for a vehicle according to claim 2, further comprising:

the automatic transmission incorporating, therein, at least one planetary gear and at least one frictional engagement element, wherein the controller controls engagement, and disengagement, of the at least one frictional engagement element by the oil pressure generated by the oil pump.

10. An automatic transmission apparatus for a vehicle according to claim 1, further comprising:

a lock-up clutch capable of connecting the pump impeller and the turbine, wherein the controller controls engagement, and disengagement, of the lock-up clutch by the oil pressure generated by the oil pump.

11. An automatic transmission apparatus for a vehicle according to claim 2, further comprising:

a lock-up clutch capable of connecting the pump impeller and the turbine, wherein the controller controls engagement, and disengagement, of the lock-up clutch by the oil pressure generated by the oil pump.

12. An automatic transmission apparatus for a vehicle comprising:

an engine;

an automatic transmission connected to the engine;

a torque converter positioned between the engine and the transmission and being connected to the engine and the automatic transmission, the torque converter incorporating, therein, a pump impeller connected to the engine and a turbine connected to the automatic transmission;

an oil pump connected to the pump impeller and to the turbine; and a controlling means for selecting one of the engine and the turbine as a driving power source of the oil pump, wherein the oil pump generates an oil pressure by rotation of the selected one of the engine and the turbine.

13. An automatic transmission apparatus for a vehicle according to claim 12 further comprising:

a first one-way clutch connecting a drive shaft of the oil pump and the pump impeller; and a second one-way clutch connecting the drive shaft of the oil pump and the turbine.

14. An automatic transmission apparatus according to claim 12 further comprising:

a lock-up clutch capable of connecting the pump impeller and the turbine, wherein, the controller disengages the lock-up clutch and establishes a vehicle inertia driving condition in which an engine activation is discontinued, and wherein, in response to a predetermined operation during the vehicle inertial driving condition, the controller establishes a predetermined shift stage in the automatic transmission and engages the lock-up clutch in such a manner that a rotational driving force of a wheel axle side is transmitted to the engine.

15. An automatic transmission apparatus according to claim 13 further comprising:

a lock-up clutch capable of connecting the pump impeller and the turbine, wherein, the controller disengages the lock-up clutch and establishes a vehicle inertia driving condition in which an engine activation is discontinued, and wherein, in response to a predetermined operation during the vehicle inertial driving condition, the controller establishes a predetermined shift stage in the automatic transmission and engages the lock-up clutch in such a manner that a rotational driving force of a wheel axle side is transmitted to the engine.

* * * * *